April 1, 1947.  W. DIEZEL  2,418,400
CAN COVER LINING MACHINE
Filed Sept. 26, 1945  9 Sheets-Sheet 1

INVENTOR
*Willy Diezel*
BY
ATTORNEY

April 1, 1947.   W. DIEZEL   2,418,400
CAN COVER LINING MACHINE
Filed Sept. 26, 1945   9 Sheets-Sheet 4

Fig. 4

INVENTOR
Willy Diezel
BY 
ATTORNEY

April 1, 1947. W. DIEZEL 2,418,400
CAN COVER LINING MACHINE
Filed Sept. 26, 1945 9 Sheets-Sheet 5

INVENTOR
Willy Diezel
BY

ATTORNEY

April 1, 1947.  W. DIEZEL  2,418,400
CAN COVER LINING MACHINE
Filed Sept. 26, 1945  9 Sheets-Sheet 8

Fig. 10

INVENTOR
Willy Diezel
BY
ATTORNEY

April 1, 1947.  W. DIEZEL  2,418,400
CAN COVER LINING MACHINE
Filed Sept. 26, 1945  9 Sheets-Sheet 9

INVENTOR
Willy Diezel
BY
ATTORNEY

Patented Apr. 1, 1947

2,418,400

UNITED STATES PATENT OFFICE 2,418,400

CAN COVER LINING MACHINE

Willy Diezel, Fairfield, Conn., assignor to The Max Ams Machine Company, Bridgeport, Conn., a corporation of New York Application September 26, 1945, Serial No. 618,706

2 Claims. (Cl. 91—47)

1

The present invention relates to lining machines in which lining material is applied to covers of tin cans or the like, said lining material, when it sets, producing a gasket constituting a sealing medium between the cover and the can to which it is subsequently united.

The main object and feature of the invention is to increase the volume of lined covers produced by the machine without adversely affecting the control that necessarily must be exercised over the lining material in removing it from its source of supply and applying it to the covers, and to accomplish this by simple means.

In the accompanying drawings the invention is disclosed in a concrete and preferred form in which.

It will facilitate an explanation of the invention if attention is first directed to the diagrammatic views Figs. 1, 1a, 1b, 1c, 1d and 1e. Reference character 11 indicates cover-feeding means, of a suitable construction, having an intermittent step-by-step feeding movement. Such cover-feeding means can be in the form of an endless chain progressing intermittently in the same direction or, as here, it can be in the form of continuously reciprocating means having dogs 12 that are moved downwardly on the return stroke of said means by passing beneath covers 13, and to feed said covers intermittently on the forward stroke of the parts.

14 is a vertically movable platform, constituting a lining station, constructed and arranged to simultaneously support a plurality of covers 13 fed to it by said cover-feeding means, and to raise and lower said covers.

15 and 16 indicate two tanks, containing lining material, both located on the same side of cover-feeding means 11, in spaced relation to each other and adjacent opposite ends of lining station 14.

17 is a turret that oscillates horizontally on center 18. This turret is located adjacent lining station 14 on the same side of cover-feeding means 11 as tanks 15 and 16 and intermediate said tanks. Center 18 of turret 17 is substantially equidistant from tanks 15 and 16 and from platform 14.

19 and 20 indicate two sets of transfer molds carried by turret 17 and oscillating therewith, said two sets here being spaced approximately a quarter of a revolution apart. Tanks 15 and 16 are here, with respect to center 18, approximately one-half revolution apart. Turret 17 makes a swing in each direction of substantially a quarter of a revolution to thereby carry said two sets, 19 and 20, into position above platform 14, each set being carried in alternation above said platform, 14, and into position above that one of said two tanks which is complementary to the particular set of transfer molds. As shown, tank 15 is complementary to set 19, and tank 16 is complementary to set 20.

Each tank, 15 or 16, is provided with a group of tank molds, such as 21 or 22, mounted to reciprocate therein. The number of tank molds in each group 21 or 22 is equal to the number of transfer molds in each set 19 or 20, and the number of transfer molds in each set 19 or 20 is equal to the number of covers 13 simultaneously supported on platform 14. In the present instance, the number is two.

Suitable means, to be described at a later point herein, are provided to oscillate turret 17 substantially a quarter of a revolution in each direction and to cause it to dwell at the end of each swing in each direction to allow platform 14 to rise and press covers 13, then on said platform, against the set of transfer molds then in position above said platform to thereby apply lining material to said covers, and at the same time allow that group of tank molds, then in registration with the other set of transfer molds, to rise and apply lining material to said other set of transfer molds. Platform 14 rises during the dwell at the end of each swing in each direction of turret 17, but the groups of tank molds 21 and 22 move up and down in alternation after successive swings of turret 17 in opposite directions.

Suitable means, to be described later, are provided to impart, in the present instance, two intermittent steps to dogs 12 during the swing in each direction of turret 17. This operation will be understood if we consider line A in Fig. 1 as indicating the beginning of a swing of turret 17. At this time, the two dogs 12, shown in the diagrams, will be in the position Fig. 1a. While turret 17 moves from position A to position B in Fig. 1, dogs 12 move from position Fig. 1a to position Fig. 1b, and covers 13 are advanced one step to bring one cover on platform 14. While turret 17 moves from position B to position C in Fig. 1, dogs 12 return and move from position Fig. 1b to position Fig. 1c, and covers 13 remain stationary. While turret 17 moves from position C to position D in Fig. 1, dogs 12 move from position Fig. 1c to position Fig. 1d, thereby advancing covers 13 another step to bring two covers into position with respect to platform 14. When turret 17 arrives at position D, it dwells, the dwell being indicated by D—E in Fig. 1, and, during this dwell, dogs 12 have a return movement from position Fig. 1d to position Fig. 1e, without affecting the position of the two covers 13. During this period of dwell, D—E of Fig. 1, platform 14 rises and falls, as does one of the groups (22) of the tank molds. On the swing of turret 17 in the other direction, dogs 12 move as previously described, platform 14 rises and falls during the dwell of the turret after said swing in the other direction, and group 21 of the tank molds rises and falls.

The general features and function of the machine of the invention having now been disclosed, a more detailed description of the construction of the machine will be given.

Figure 10:
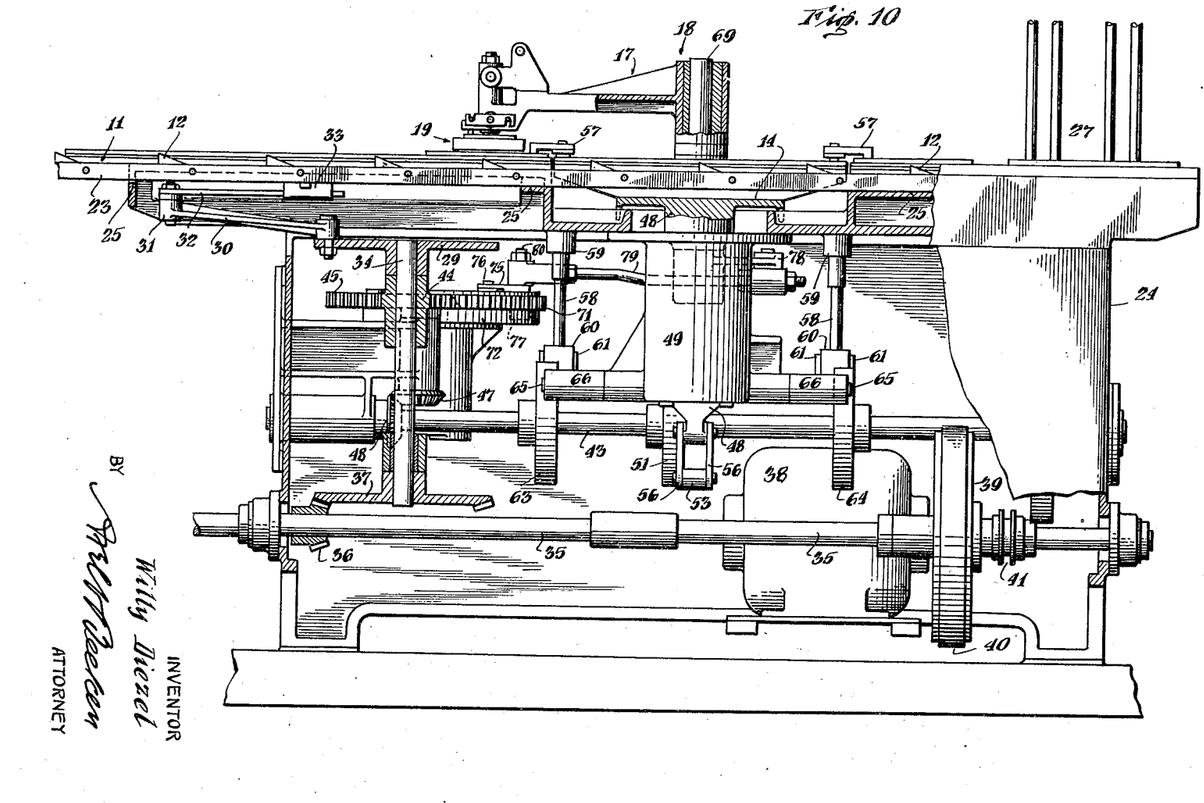
Fig. 10 is a vertical sectional view with parts broken away substantially on the plane of irregular line 10—10 of Fig. 2.

Dogs 12 are here mounted on a reciprocatory bar 23 sliding horizontally in the framework, 24, of the machine, said bar being supported as at 25 in said framework (Fig. 10). Said dogs 12 are spring-pressed, in a well-understood manner, to normally project upwardly thereby feeding covers 13 on the forward stroke of bar 23, and to yield downwardly on the return stroke of bar 23 so that they will pass under covers 13 without moving them. Covers 13, each having a flange 26 to which lining material is to be applied in a manner known in the art, can be fed to the machine from a suitable source such as stack 27, and slide on suitable ledges 28 as they are advanced by dogs 12.

Figure 5:
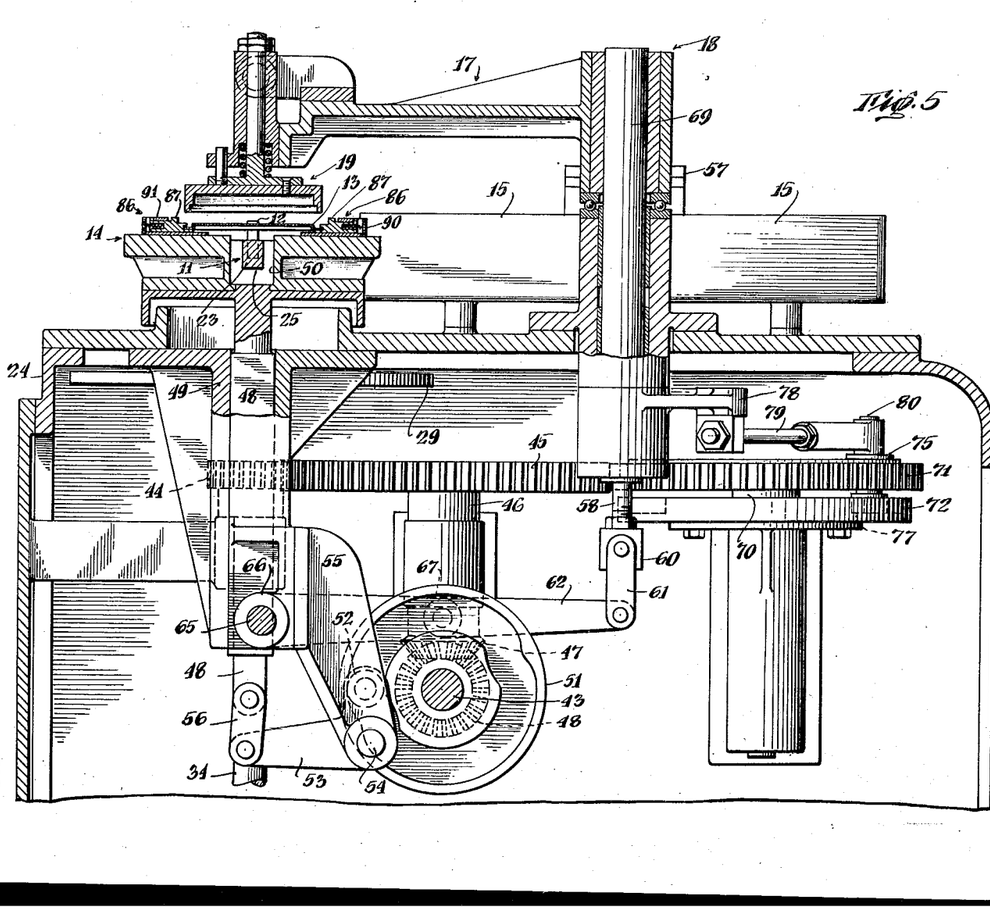
Fig. 5 is a transverse vertical sectional view substantially on the plane of irregular line 5—5 of Figs. 2 and 4 and with parts broken away and in section.

The means to reciprocate bar 23 consist of a disc 29 carrying crank arm 30 pivotally connected at 31 to link 32, which latter is connected to block 33 attached to bar 23 (Figs. 5 and 10). Disc 29 is mounted to rotate with shaft 34 suitably driven from main shaft 35 as by means of bevel gears 36 and 37.

Main shaft 35 can receive power in any suitable way as from motor 38, pulleys 39 and belt 40. A clutch 41, operated by hand lever 42 can be interposed between shaft 35 and one of the pulleys 39.

The means to raise and lower platform 14 and the two groups of tank molds 21 and 22 are actuated by cam shaft 43, which latter is driven from shaft 34 by pinion 44 meshing with spur gear 45 on shaft 46, on which shaft 46 is a bevel gear 47 meshing with bevel gear 48 on cam shaft 43.

Figures 1, 1A:
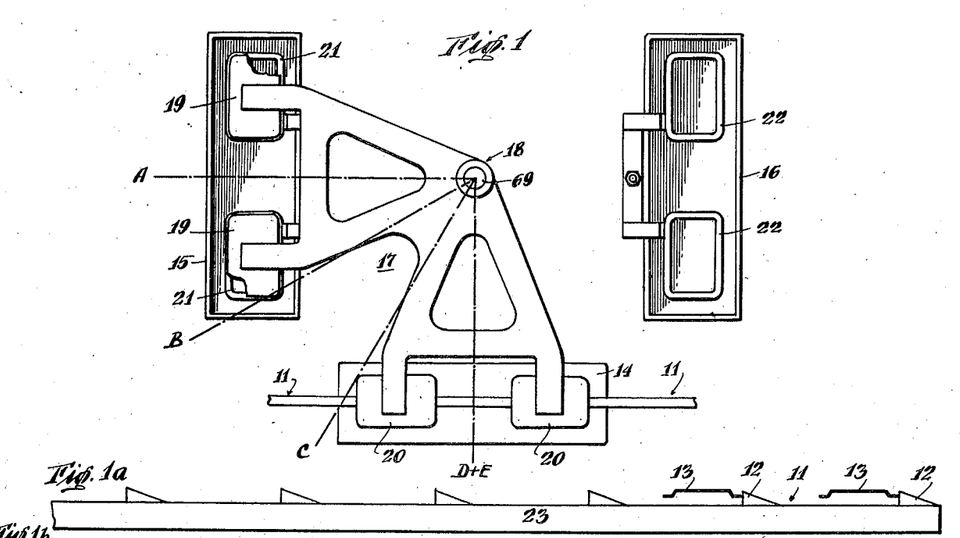
Fig. 1 is a diagrammatic plan view of an oscillatory turret carrying transfer molds.
Figs. 1a, 1b, 1c, 1d and 1e are diagrammatic views to illustrate the movements of cover-feeding means during the swing in each direction of the oscillatory turret.
Figures 1B, 1C:
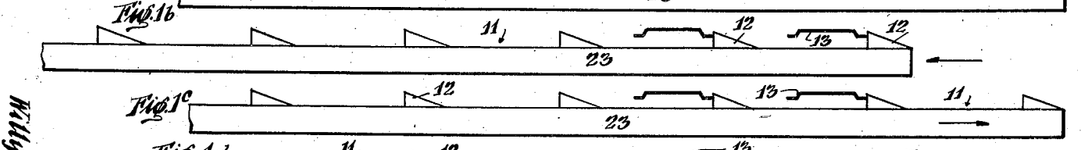
Figures 1D, 1E:
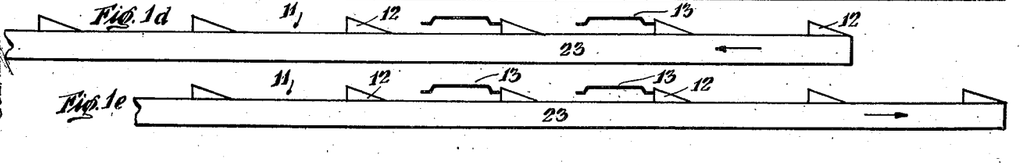
Figure 2:
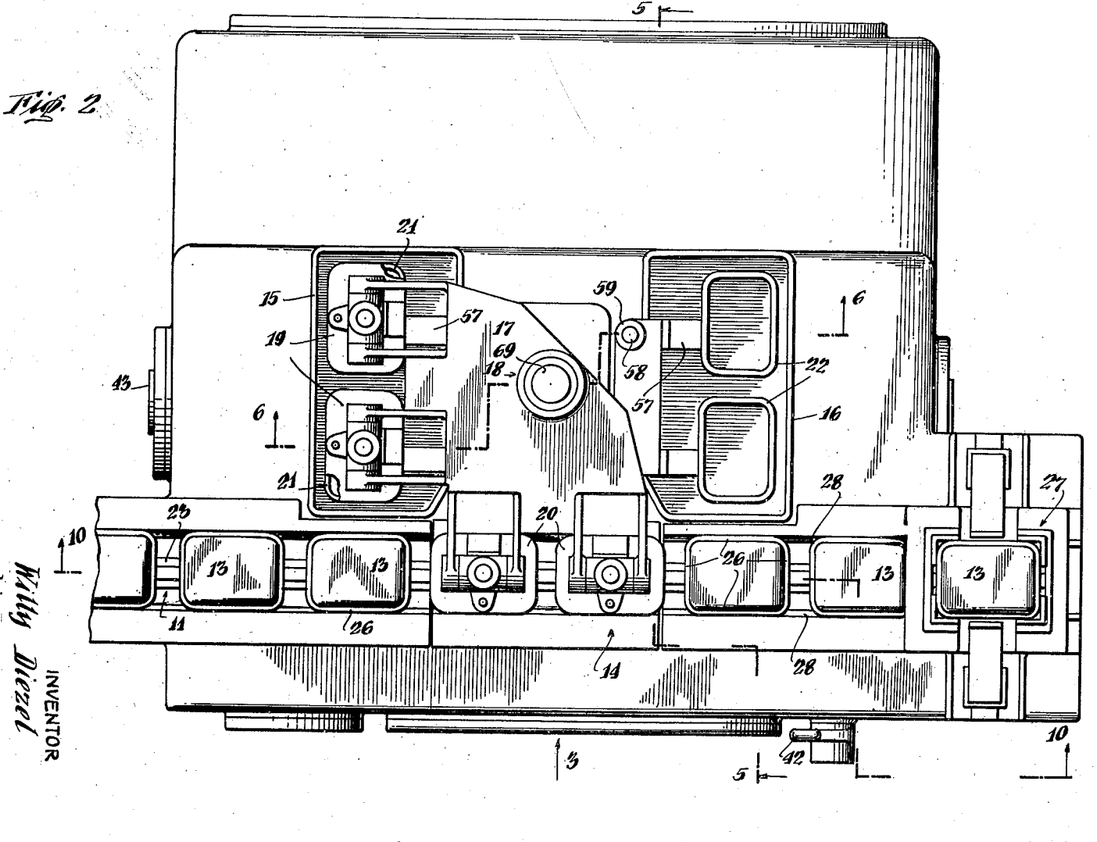
Fig. 2 is a top plan view of a machine embodying the invention.
Figure 3:
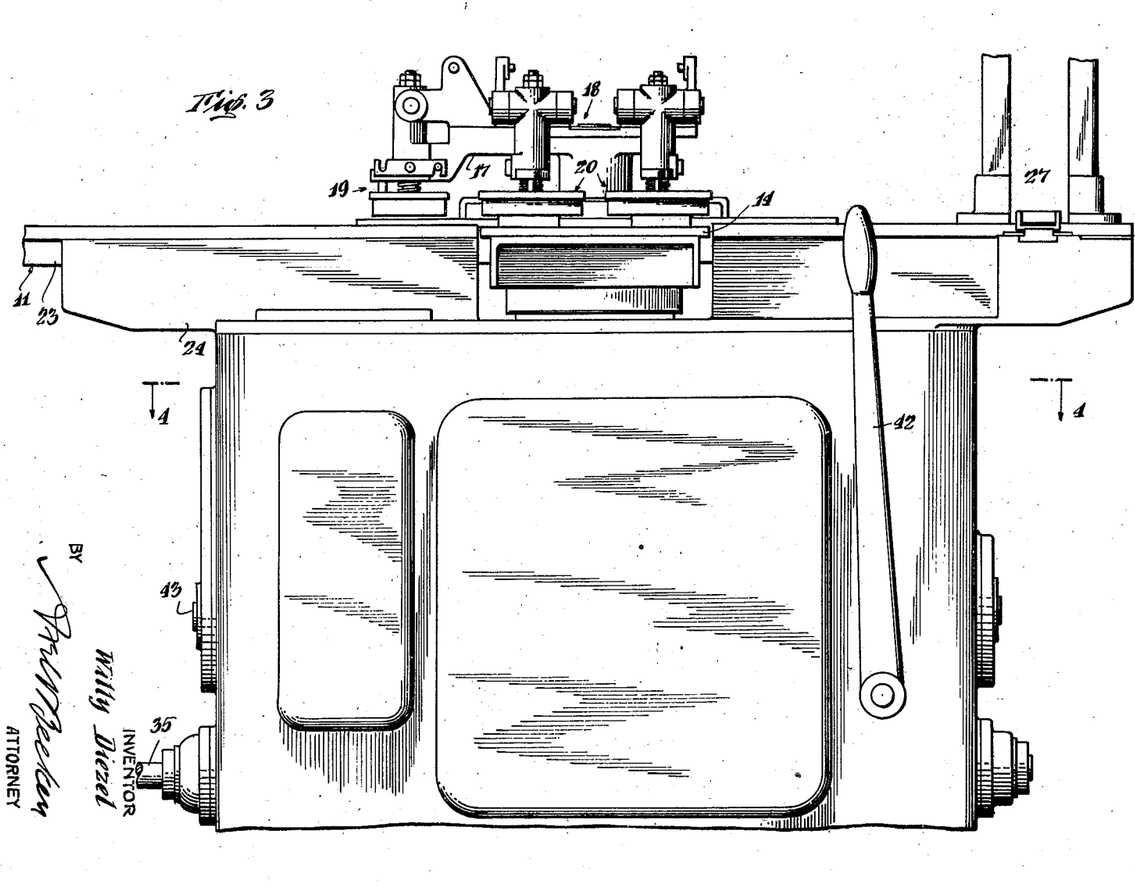
Fig. 3 is a view in front elevation looking in the direction of arrow 3 of Fig. 2.
Figure 4:
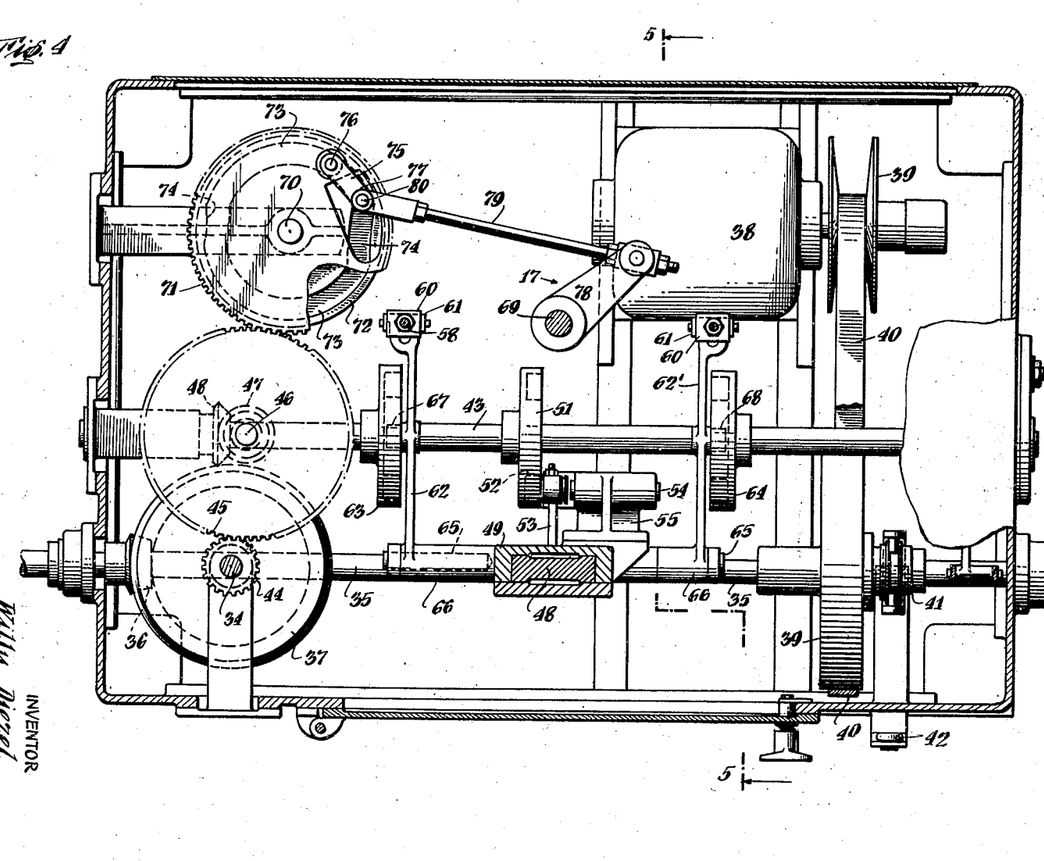
Fig. 4 is a horizontal sectional view substantially on the plane of line 4—4 of Fig. 3.

Platform 14 (Fig. 7) is constructed and arranged to simultaneously support a plurality, here two, of covers 13, and is mounted (Figs. 5, 8 and 10) on a pedestal 48 sliding in bearing 49 of the framework. The top of said platform is interposed in the line of feed of the covers and has an opening 50 (Fig. 8) to allow reciprocatory bar 23 to pass freely therethrough so that dogs 12 can push covers on and off said platform. Mounted on cam shaft 43 is a cam 51 with which engages a cam roll 52 carried by one arm of bell-crank 53. Bell-crank 53 is pivotally supported at 54 in bracket 55 of the framework and is pivotally connected by its other arm to a link 56, which latter in turn is pivotally connected to pedestal 48, to raise and lower the latter. The means to raise and lower the groups of tank molds 21 and 22 are here as follows. Each of said groups is supported by a carrier 57 (Figs. 4, 5 and 6) mounted on a vertically movable rod 58 mounted to slide in a bearing 59 of the framework. The lower end of said rod 58 carries a block 60 to which are pivotally connected two parallel links 61 that, in turn, are pivotally connected to a cam lever 62. 63 and 64 indicate two cams mounted on cam shaft 43, one cam, 63, for cam lever 62 of one group of tank molds 21, and the other cam 64 for cam lever 62¹ of the other group of tank molds 22. Each cam lever 62 or 62¹ is pivotally supported on one of two stub shafts 65 mounted in bearings 66 of bracket 55, and each cam lever carries a cam roll 67 or 68 to engage cams 63 and 64.

Figure 11:
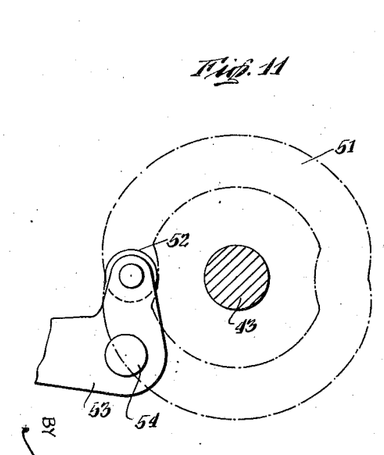
Figs. 11, 12 and 13 are diagrammatic views showing the timing of certain cams mounted on a cam shaft of the machine.
Figure 12:
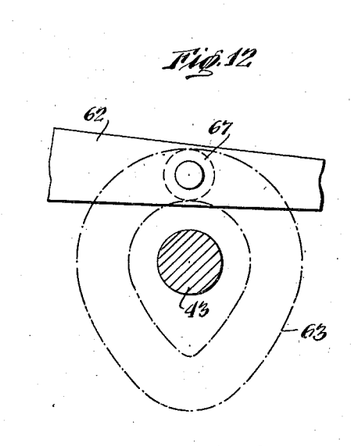
Figure 13:
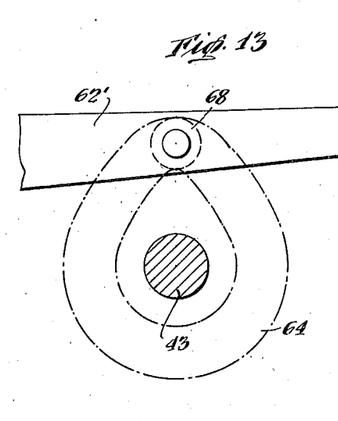

Figs. 11, 12 and 13 show the relative timing of the three cams 51, 63 and 64 mounted on cam shaft 43, from which it will be seen that cam 51 actuates its cam roll twice to each revolution of cam shaft 43, while cams 63 and 64 actuate their cam rolls only once during said revolution and in alternation with each other.

Turret 17 is mounted to oscillate on stationary shaft 69 and to make a swing of substantially a quarter of a revolution in each direction, with a dwell or pause after each swing in each direction, as previously indicated. The means for obtaining this motion are, in the present instance, as follows: 70 is a rotatable shaft carrying a crank disc 71, here in the form of a gear, that receives its motion by meshing with gear 45 on shaft 46. 72 is a stationary cam mounted in the framework in axial alinement with said disc 71. Said cam is provided with a cam groove having two concentric portions 73 and two dwell portions 74. 75 indicates a crank arm pivotally supported at 76 on a crank disc 71, and at the end of said crank arm is a cam roll 77 (best seen in Figs. 5 and 10) to travel in the groove of stationary cam 72. A lever 78 is secured to turret 17, and 79 indicates a connection extending between the outer end of said lever 78 and the end of crank arm 75, being pivotally connected to both. The center of cam roll 77 and pivot 80 that connects connection 79 with crank arm 75 are in axial alinement. It will now be seen that, so long as cam roll 77 travels in a concentric groove portion 73 of cam 72, the parts will act as an ordinary crank motion, but that, when cam roll 77 travels in a dwell portion 74 of cam 72, turret 17 will stand still.

As indicated by the gearing, shafts 70 and 43 make one revolution to every four revolutions of shaft 34.

The detailed construction of the individual transfer molds of the two sets 19 and 20 need not be described as said molds can be constructed like the molds of Patent No. 2,288,224 of June 30, 1942.

Figure 6:
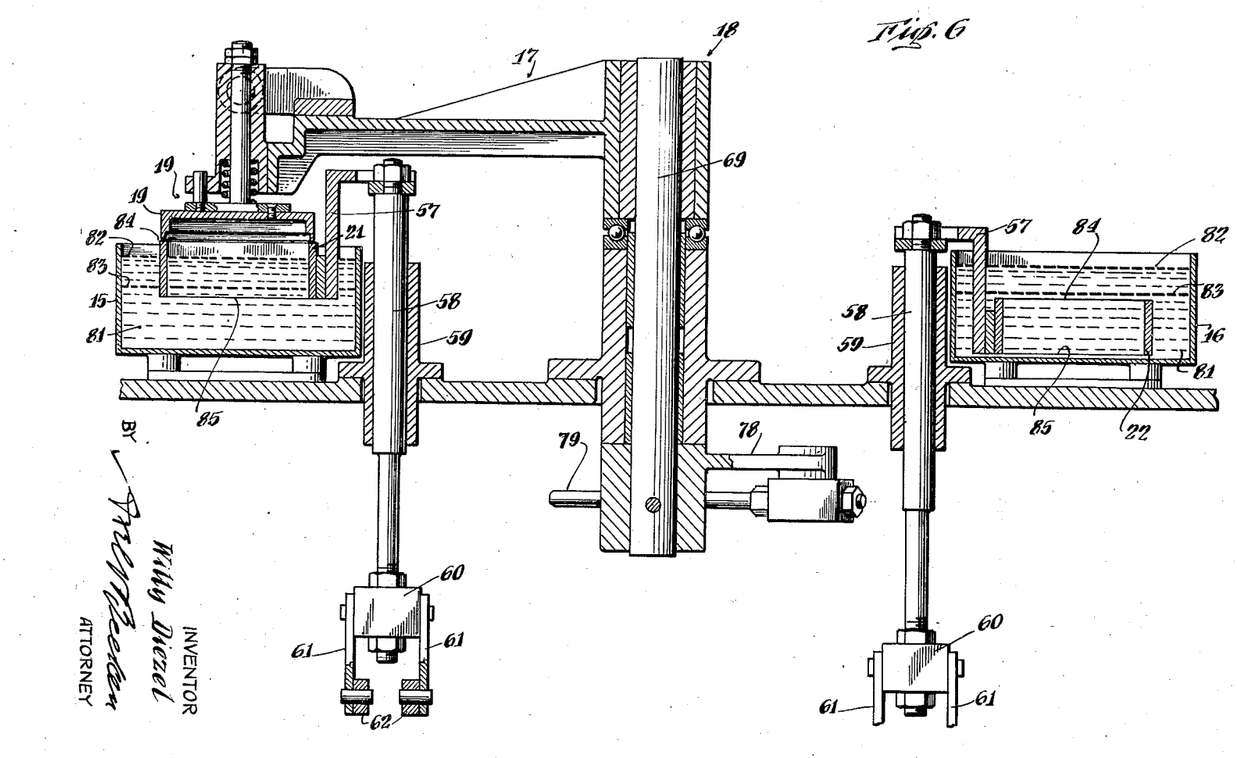
Fig. 6 is a vertical sectional view substantially on the plane of irregular line 6—6 of Fig. 2.
Figures 7, 8, 9:
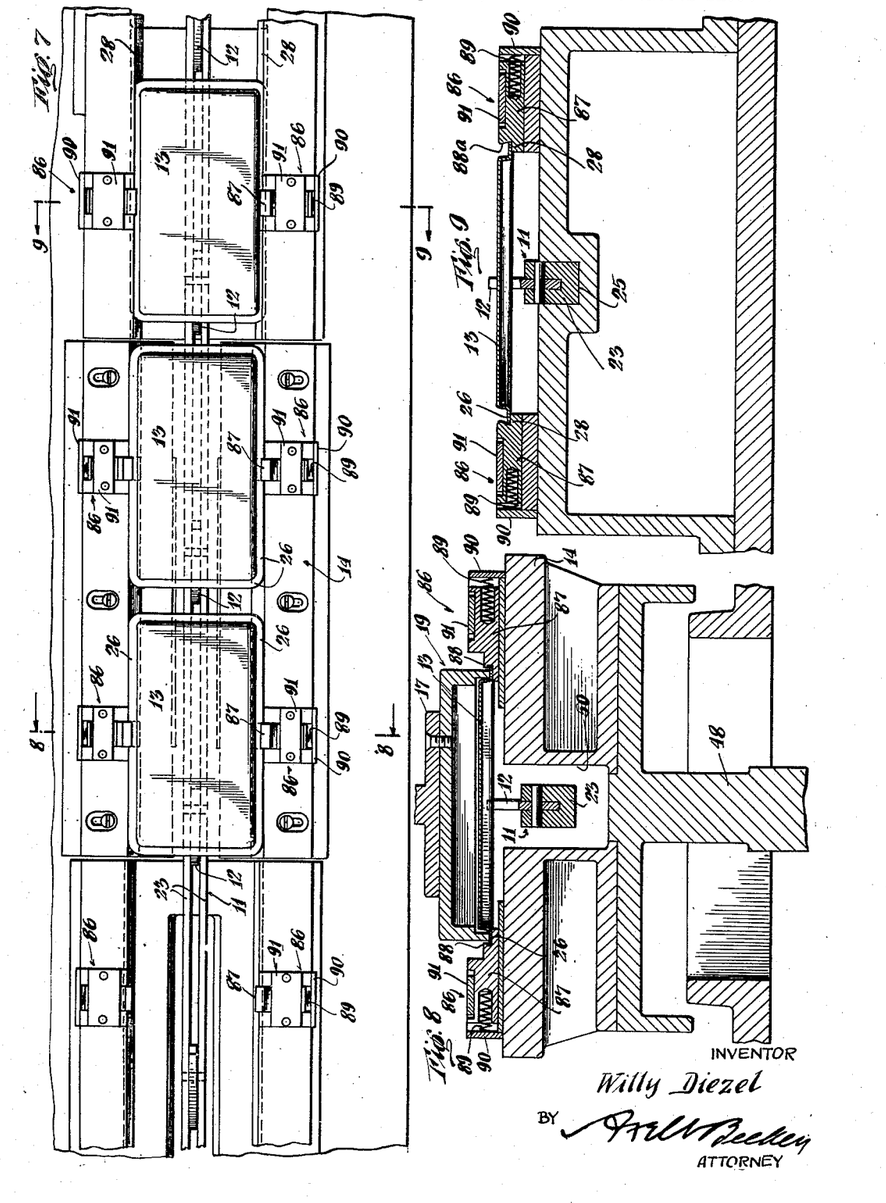
Fig. 7 is a fragmentary plan view of the cover-feeding means, and of a platform constituting a lining station.
Fig. 8 is a transverse sectional view substantially on the plane of line 8—8 of Fig. 7.
Fig. 9 is a transverse sectional view substantially on the plane of line 9—9 of Fig. 7.

One of the difficulties heretofore experienced in lining machines is the proper control of the lining material, especially when removing it from tanks such as 15 or 16 (see Fig. 6). In the prior art, it has been the custom to so relate the depth of the tank and the height and up-and-down movement of the tank mold that, on the up-stroke of the tank mold, its lower surface would leave the lining material and, on the down stroke, would enter said lining material abruptly, thereby producing undesirable splashing and webbing of said lining material. In Fig. 6, the lining material is indicated at 81 and it will be seen that a tank such as 15 or 16 is constructed and arranged to contain what may be called a maximum depth of lining material indicated by line 82 and a predetermined minimum indicated by line 83. It will further be seen that the height of a tank mold, 21 or 22, and the extent of its stroke is such that, so long as said minimum indicated by line 83 is maintained, the upper surface 84 of said tank mold will be completely covered when said tank mold is in its lower position, and that the lower surface 85 of said tank mold will not leave the lining material when the tank mold is in its upper position, but will remain submerged. In this way, splashing and webbing are avoided.

Conventional braking means, generally employed in the art, can be utilized to bring covers 13 to a state of rest between each intermittent feeding motion. But, in the present instance, the following construction is preferred because the covers are at all times visible to the operator, and because no removal of machine parts is necessary in order to correct a jam in the cover feed.

The covers in their passage travel on stationary supporting ledges or guide rails 28, on which latter rest flanges 26 of said covers. Interposed in said ledges (Figs. 7, 8 and 9) are braking means for the covers, such means being located at intervals such as to engage the middle edge portion of the covers when said covers are at rest. The braking means comprise groups of opposed side gauges 86, some of which are located on platform 14. Each gauge comprises a block 87 slidable transversely of the path of movement of the covers, and is provided with an upstanding flange 88 to engage the edge of flange 26 of the covers. Spring means 89, anchored on stationary member 90, tend to urge block 87 toward a cover, and suitable means, such as cross-bar 91, limit the sliding movement of said block. In the case of the block of a gauge located on platform 14 (Fig. 8), it will be observed that sufficient clearance has to be allowed to permit a transfer mold (19 or 20) to deposit lining material on flange 26 of the cover, but, in case of the block of a gauge not so located, upstanding flange 88a (Fig. 9) can have a slight overhang, as shown.

It will now be understood that, as a cover approaches an opposed group of gauges, the rounded corners of the cover will push the blocks of an opposed group of gauges outwardly in a transverse direction and the upstanding flange 88 or 88a of said blocks 87 will engage the edges of the side flanges of said cover. Under the compulsion of dogs 12, the cover will slide in engagement with said upstanding flanges, which then form continuations of stationary flanges of ledges or rails 28, and that, so soon as the feeding motion of dogs 12 ceases, the braking action of blocks 87 will become effective to stop the cover. If desired, blocks 87 can have horizontal ledges that form continuations of stationary ledges 28.

I claim:

1. In a lining machine for applying lining material to covers, the combination of cover-feeding means having an intermittent step-by-step feeding movement; a vertically movable platform, constituting a lining station, constructed and arranged to simultaneously support a plurality of covers fed to it by said cover-feeding means, and to raise and lower said covers; two tanks, containing lining material, both located on the same side of said cover-feeding means, in spaced relation to each other and adjacent opposite ends of said lining station; a horizontally oscillatory turret located, adjacent said lining station, on the same side of said cover-feeding means as said two tanks and intermediate the latter, the center of said turret being substantially equidistant from said tanks and from said platform, said turret constructed and arranged to support two sets of transfer molds, one set complementary to one, and the other set to the other, of said tanks, and to carry said two sets in alternation into position above said platform, each set of transfer molds being carried in alternation into position above said platform and into position above that one of said two tanks which is complementary to the particular set of transfer molds; a group of tank molds, mounted to reciprocate vertically, in each tank, the number of tank molds in each group being equal to the number of transfer molds in each of said sets carried by said turret; two sets of transfer molds, the number of transfer molds in each set corresponding to the number of covers simultaneously supported by said platform, mounted to oscillate with said turret, said sets of transfer molds being so spaced apart that when either set is above said platform and in registry with the covers on the latter, the other set will be above its complementary tank and in registry with the tank molds thereof; means to oscillate said turret horizontally, and to cause it to dwell at the end of each swing in each direction, to bring, at the end of one swing in one direction, one set of transfer molds in registration with the covers then on said platform and the other set of transfer molds in registration with the group of tank molds of its complementary tank, and to bring at the end of the swing in the other direction the other set of transfer molds in registration with the covers then on said platform and said one set of transfer molds in registration with the group of tank molds of its complementary tank; means to raise and lower the group of tank molds of one tank at the end of a swing in one direction of said turret, and to raise and lower the group of tank molds of the other tank at the end of a swing in the other direction of said turret, to thereby, during the dwell of said turret after a swing in each direction, apply lining material to the set of transfer molds then above its complementary tank; means to raise and lower said platform to simultaneously press a plurality of covers against the transfer molds of a set during each dwell after each swing in each direction of said turret; and means to actuate said cover-feeding means to bring, during each swing in each direction of said turret, a plurality of covers into position on said platform.

2. In a lining machine for applying lining material to covers, the combination of cover-feeding means having an intermittent step-by-step feeding movement; a vertically movable platform, constituting a lining station, constructed and arranged to simultaneously support a plurality of covers fed to it by said cover-feeding means, and to raise and lower said covers; two tanks, containing lining material, both located on the same side of said cover-feeding means, in spaced relation to each other and adjacent opposite ends of said lining station; a horizontally oscillatory turret located, adjacent said lining station, on the same side of said cover-feeding means as said two tanks and intermediate the latter, the center of said turret being substantially equidistant from said tanks and from said platform, said turret constructed and arranged to support two sets of transfer molds, one set complementary to one, and the other set to the other, of said tanks, and to carry said two sets in alternation into position above said platform, each set of transfer molds being carried in alternation into position above said platform and into position above that one of said two tanks which is complementary to the particular set of transfer molds; a group of tank molds, mounted to reciprocate vertically, in each tank, the number of tank molds in each group being equal to the number of transfer molds in each of said sets carried by said turret; two sets of transfer molds, the number of transfer molds in each set corresponding to the number of covers simultaneously supported by said platform, mounted to oscillate with said turret, said sets of transfer molds being so spaced apart that when either set is above said platform and in registry with the covers on the latter, the other set will be above its complementary tank and in registry with the tank molds thereof; means to oscillate said turret horizontally, and to cause it to dwell at the end of each swing in each direction, to bring, at the end of one swing in one direction, one set of transfer molds in registration with the covers then on said platform and the other set of transfer molds in registration with the group of tank molds of its complementary tank, and to bring at the end of the swing in the other direction the other set of transfer molds in registration with the covers then on said platform and said one set of transfer molds in registration with the group of tank molds of its complementary tank; means to raise and lower the group of tank molds of one tank at the end of a swing in one direction of said turret, and to raise and lower the group of tank molds of the other tank at the end of a swing in the other direction of said turret, to thereby, during the dwell of said turret after a swing in each direction, apply lining material to the set of transfer molds then above its complementary tank; means to raise and lower said platform to simultaneously press a plurality of covers against the transfer molds of a set during each dwell after each swing in each direction of said turret; and means to impart a plurality of feeding movements to said cover-feeding means to bring, during each swing in each direction of said turret, a plurality of covers into position on said platform.

WILLY DIEZEL.

REFERENCES CITED

The following references are of record in the file of this patent:

UNITED STATES PATENTS

| Number | Name | Date |
|---|---|---|
| 1,835,570 | Lorenz | Dec. 8, 1931 |
| 2,119,725 | Stecher | June 7, 1938 |
| 2,321,090 | Keltz | June 8, 1943 |
| 2,387,283 | Oakley | Oct. 23, 1945 |
| 1,865,830 | Butler | July 5, 1932 |
| 2,297,730 | Turnock et al. | Oct. 6, 1942 |